S. S. KRAYER.
RESILIENT VEHICLE TIRE.
APPLICATION FILED MAR. 3, 1913.
1,097,237.
Patented May 19, 1914.
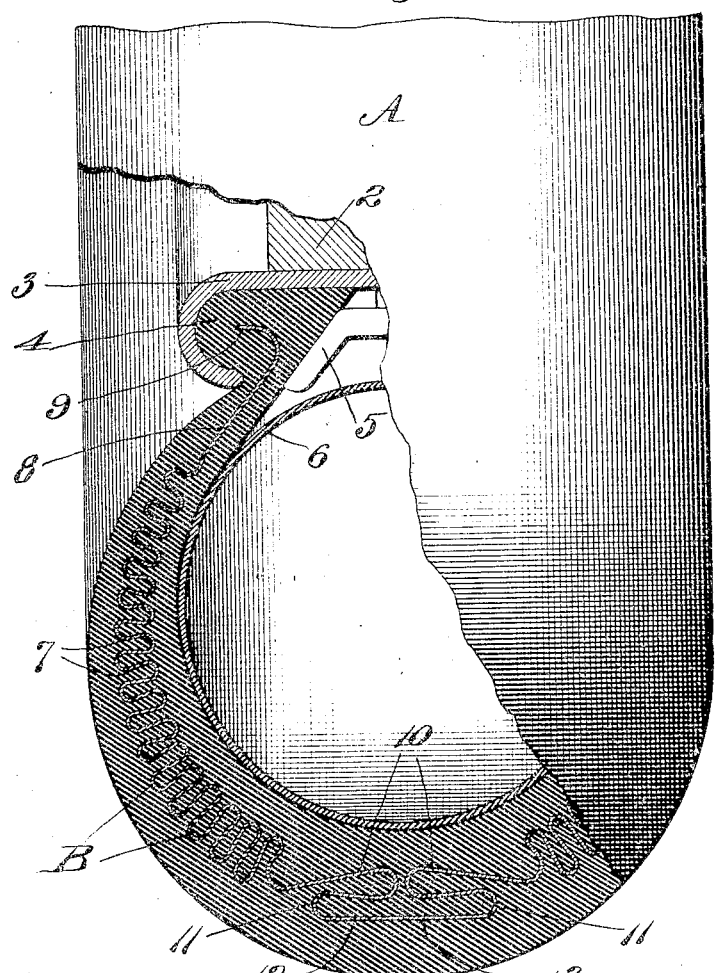
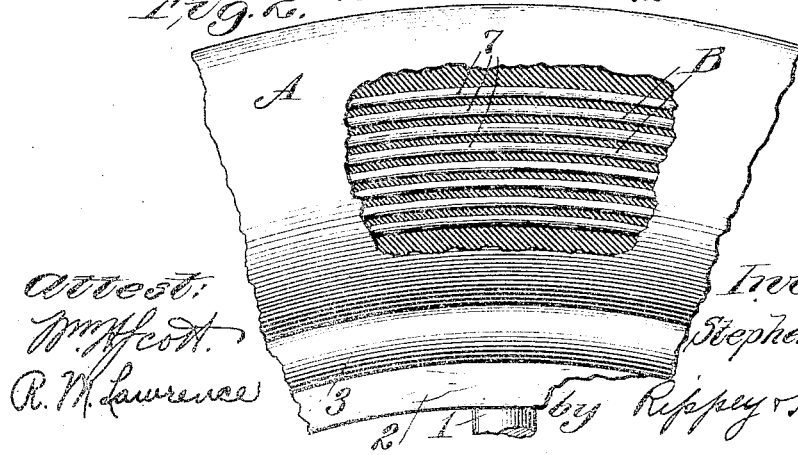

UNITED STATES PATENT OFFICE.

STEPHEN S. KRAYER, OF ST. LOUIS, MISSOURI.

RESILIENT VEHICLE-TIRE.

1,097,237.  Specification of Letters Patent.  Patented May 19, 1914.

Application filed March 3, 1913. Serial No. 751,813.

*To all whom it may concern:*

Be it known that I, STEPHEN S. KRAYER, a citizen of the United States, residing at the city of St. Louis, State of Missouri, have invented a new and useful Resilient Vehicle-Tire, of which the following is a specification.

This invention relates to resilient vehicle tires and consists in the novel construction disclosed and claimed.

An object of the invention is to provide a reinforced flexible metal shield embedded in a case of elastic material which will prevent the penetration of the tire and which will not reduce to any appreciable extent the resiliency thereof.

With this and other apparent objects in view, I have produced a new article of manufacture comprising the parts of the novel design and arrangement hereinafter described and claimed, reference being made, in the course of the description, to the accompanying drawing, in which like parts are indicated by like reference characters, and in which—

Figure 1 is a view of my improved tire partially in cross section and partially in elevation. Fig. 2 is a side elevation of a fragment of the tire, a portion of the case being broken away to disclose more clearly the manner in which the reinforcing flexible metal shield is embedded therein.

In the embodiment of my invention illustrated in the drawing 1 indicates the spokes of the wheel, which support a felly member 2, which is formed with a channel 3, adapted to receive the enlarged annular beads 4, formed on the case A, and is held in adjustment by the usual wedge block 5.

The case A, is of usual design and shape and is formed from some suitable elastic material such as rubber and is adapted to incase an inflated inner tube 6, or it may be used as a single tube tire, in which case the air pressure is introduced within the same as will be readily understood by those familiar with the art.

The member B, is embedded in the case A, and is of novel construction peculiarly adapted as a shield and reinforcement for the case A, to prevent the penetration thereof, without detracting from the usual elasticity or resiliency thereof. The member B comprises an annular frame constructed preferably of some durable flexible metal, such for instance as spring brass. The side walls of the shield B are doubled or fluted to form the folds or plaits 7 adjacent to their free or open ends. The said walls of the frame B extend substantially parallel with the walls of the case A for a distance as shown at 8, and then are bent substantially at right angles as shown at 9.

The folds or plaits 7 are so arranged that their walls are substantially at right angles with the side walls of the case. Above the tread of the case A, the shield B is bent so as to form the inwardly extending fold 10 and the outwardly extending fold 11, the outer ends thereof being joined by the wall 12 parallel to the tread. Thus the shield, at this point presents three separated thicknesses of metal parallel with the tread, for substantially the full width thereof. Thus it will be seen that in use the lines of pressure will always be transverse to the walls of the folds and, therefore, always parallel with the flexed or bent ends thereof which impart resiliency to the shield and, therefore, that the resiliency of the elastic case will not be appreciably impaired, but that it will be difficult for any sharp article to penetrate the shield. Moreover, the shield constitutes an effective reinforcement for the case and will thus prevent a blowing out of the case from the air pressure within.

I am aware that changes in the construction within equivalent limits may be made and I do not restrict myself therefore to exact details, but

What I claim and desire to secure by Letters Patent is:

1. A vehicle tire comprising an elastic case, and a resilient annular metal frame embedded therein, said frame being provided with a series of plaits or folds at each side, the walls of which are substantially transverse to the walls of the case, and being bent above the tread to provide three separated thicknesses of metal, substantially as specified.

2. A vehicle tire comprising an elastic case and an annular metal frame flexed to form fluted side walls and a three wall fold at its periphery, embedded therein, substantially as shown and described.

In witness whereof, I have signed this specification in the presence of two subscribing witnesses.

STEPHEN S. KRAYER.

Witnesses:
NELSON THOMAS,
L. C. KINGSLAND.